July 12, 1927.
R. C. WILLIAMS
GUIDE FOR STRAIGHTEDGES
Filed Oct. 19, 1925
1,635,352
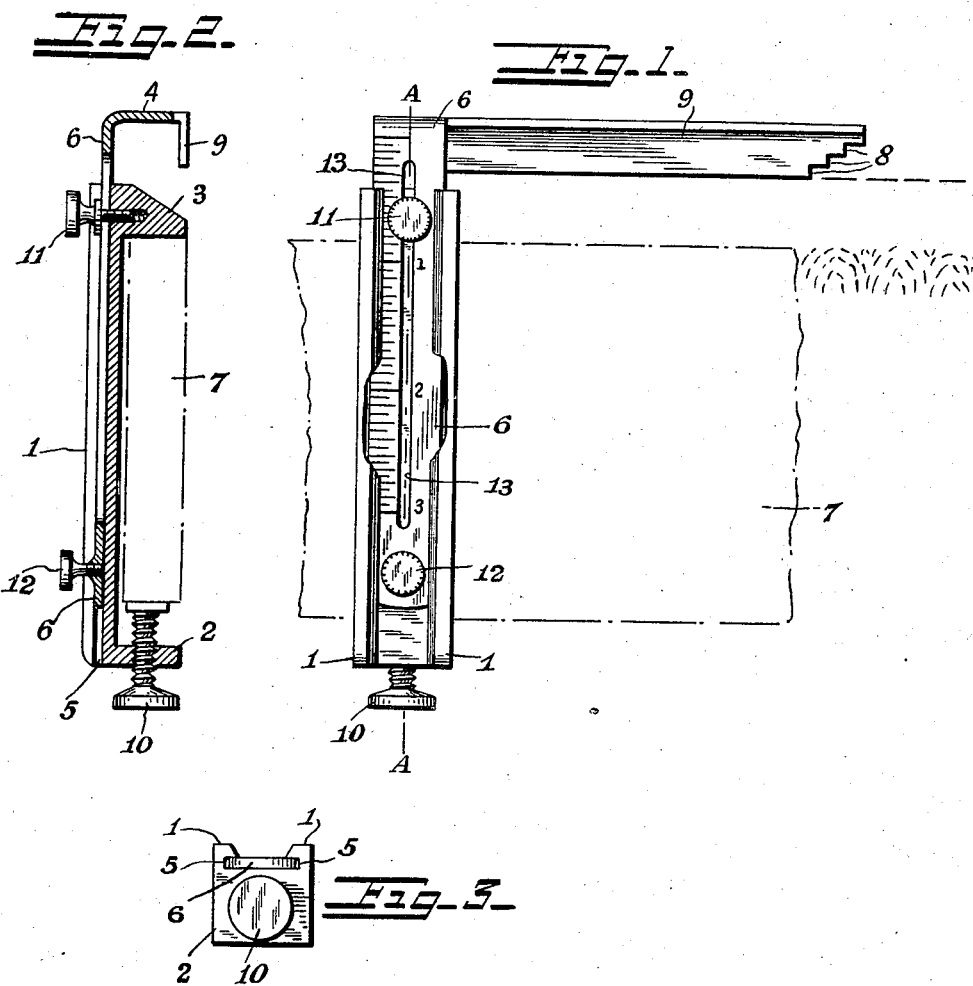
Inventor
Robert C. Williams.

Patented July 12, 1927.

1,635,352

UNITED STATES PATENT OFFICE.

ROBERT C. WILLIAMS, OF SAN FRANCISCO, CALIFORNIA.

GUIDE FOR STRAIGHTEDGES.

Application filed October 19, 1925. Serial No. 63,483.

The invention relates to improvements in an adjustable guide to be attached to a straight-edge used for cutting, ruling or trimming paper, cloth or other material at an even distance from the border or edge; and the objects of the improvement are, first, to provide an adjustable guide which may be easily attached to each end of a straight-edge; second, to afford facilities for quickly adjusting the guide to a definite measurement or position; third, to quickly determine by the guide, an accurate position for each end of a straight-edge.

One form of the invention is illustrated in the accompanying drawing in which Fig. 1 is a plan or top view; Fig. 2 is a section on line A A, Fig. 1; and Fig. 3 is a section on line B B, Fig. 1.

The body or main member 1, with the arms 2 and 3 at right angles constitute the framework for the guide and is held in position on a straight-edge by engaging the straight-edge 7 with arm 3, and set screw 10. The top or face of the main member 1 contains two grooves 5 running longitudinally for the purpose of guiding a sliding scale 6, which is graduated in cooperation with index mark 14, and is locked in position by set screw 11.

The guide arm 9, which is parallel to and in direct plane with the lower surface of the straight-edge 7, is at right angles to the sliding scale 6, and is integral through the connecting arm 4, and is for the purpose of determining the position or location for the straight-edge 7, as related to the border or outer edge of the paper or material to be cut or ruled.

The notches 8, in the guide-arm 9, are for making small adjustments or allowances without changing the position of the sliding-scale 6.

A slot 13, running lengthwise, partway of sliding scale 6, permits it to move back and forth past the set screw 11. The sliding-scale 6 is marked off in inches and fractions thereof for accurately adjusting the guide-arm 9 to the same measurement at each end of the straight edge; or to a different measurement, if necessary, as in the case of trimming wall paper.

In the use of a straight-edge, which has no attachment or means for determining a fixed position to cut, rule or trim a quantity of paper or other material at the same even distance from the outer edge of said paper or material or according to an irregular border, it is difficult to quickly adjust the straight-edge to an accurate position; and it may readily be seen that by the combination with a guide as herein described, both ends of the straight-edge may be accurately adjusted at a glance thereby saving time and labor otherwise required to use a measuring rule and adjust each end of the straight-edge on each separate sheet or piece of material to be so cut, ruled or trimmed alike.

The design and construction of a guide for a straight-edge may vary somewhat from the form illustrated in the accompanying drawings.

I claim:

The combination, in a guide for a straight edge, of an enlongated clamp having an arm at each end, with a set screw through one arm to engage one edge of said straight-edge, and having two grooves running lengthwise to receive an adjustable scale, a scale having a guide arm at one end, mounted in said grooves and by which the position of the straight-edge is determined, a set screw for holding said scale in a fixed position on said clamp.

ROBERT C. WILLIAMS.